United States Patent
Guo et al.

(10) Patent No.: US 10,219,218 B2
(45) Date of Patent: Feb. 26, 2019

(54) INFORMATION INTERACTION METHOD, DEVICE AND SYSTEM FOR WIRELESS BODY AREA NETWORK (WBAN)

(71) Applicant: ZTE Corporation, Shenzhen (CN)

(72) Inventors: Yang Guo, Shenzhen (CN); Shengjie Geng, Shenzhen (CN); Jing Liu, Shenzhen (CN); Ming Li, Shenzhen (CN); Xinbing Wang, Shenzhen (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 11 days.

(21) Appl. No.: 15/501,529

(22) PCT Filed: Dec. 9, 2014

(86) PCT No.: PCT/CN2014/093404
§ 371 (c)(1),
(2) Date: Feb. 3, 2017

(87) PCT Pub. No.: WO2015/154499
PCT Pub. Date: Oct. 15, 2015

(65) Prior Publication Data
US 2017/0238250 A1    Aug. 17, 2017

(30) Foreign Application Priority Data
Aug. 4, 2014    (CN) .......................... 2014 1 0379917

(51) Int. Cl.
*H04W 52/02*    (2009.01)
*H04W 4/80*    (2018.01)
(Continued)

(52) U.S. Cl.
CPC ...... *H04W 52/0216* (2013.01); *H04B 7/2656* (2013.01); *H04L 5/0055* (2013.01);
(Continued)

(58) Field of Classification Search
CPC ............. H04W 52/0216; H04W 4/008; H04W 72/0446; H04B 7/2656; H04L 5/0055
See application file for complete search history.

(56) References Cited

U.S. PATENT DOCUMENTS

| | | | |
|---|---|---|---|
| 8,279,858 B2* | 10/2012 | Ho ........................ | H04W 48/12 370/342 |
| 2011/0070836 A1* | 3/2011 | Park ...................... | H04L 1/1887 455/41.2 |
| 2011/0158206 A1* | 6/2011 | Shrestha ................ | G01D 21/00 370/336 |

FOREIGN PATENT DOCUMENTS

| | | |
|---|---|---|
| CN | 101321127 A | 12/2008 |
| CN | 102123515 A | 7/2011 |

(Continued)

OTHER PUBLICATIONS

International Search Report for corresponding application application No. PCT/CN2014/093404 filed on Dec. 9, 2014; dated May 11, 2015.

*Primary Examiner* — Jamal Javaid
(74) *Attorney, Agent, or Firm* — Cantor Colburn LLP (57) ABSTRACT

Provided are information interaction methods, devices and system for a Wireless Body Area Network (WBAN). The method includes that: a Hub sends beacon frames to nodes according to a preset superframe structure and receives, according to a preset superframe structure, information sent by the nodes. The preset superframe structure includes three phases. The first phase includes a first beacon period, a first timeslot period and a second timeslot period, the first timeslot period being used by nodes to send an emergency service and the second timeslot period being used by nodes to send an ordinary service. The second phase includes a second beacon period and a third timeslot period, the third timeslot period being used by nodes to complementarily (Continued)

Superframe send a service. The third phase includes a fourth timeslot period, the fourth timeslot period being used by nodes to send a sleep application and/or an access application.

21 Claims, 5 Drawing Sheets

(51) Int. Cl.
*H04B 7/26* (2006.01)
*H04L 5/00* (2006.01)
*H04W 72/04* (2009.01)
*H04W 84/18* (2009.01)

(52) U.S. Cl.
CPC ......... *H04W 4/80* (2018.02); *H04W 72/0446* (2013.01); *H04W 52/0229* (2013.01); *H04W 84/18* (2013.01); *Y02D 70/00* (2018.01); *Y02D 70/124* (2018.01); *Y02D 70/142* (2018.01); *Y02D 70/449* (2018.01)

(56) References Cited

FOREIGN PATENT DOCUMENTS

| | | |
|---|---|---|
| CN | 103281793 A | 9/2013 |
| WO | 20120161396 A1 | 11/2012 |

\* cited by examiner

Fig. 1

A Hub sends beacon frames to Sensors according to a preset superframe structure and receives, according to the preset superframe structure, information sent by the Sensors, wherein the preset superframe structure includes three phases, the first phase includes a first beacon period, a first timeslot period and a second timeslot period, the first timeslot period being used by Sensors to send an emergency service and the second timeslot period being used by Sensors to send an ordinary service; the second phase includes a second beacon period and a third timeslot period, the third timeslot period being used by Sensors to complementarily send a service; and the third phase includes a fourth timeslot period, the fourth timeslot period being used by Sensors to send a sleep application and/or an access application ⟋S202

A Sensor sends information to a Hub according to a preset superframe structure and receives a beacon frame sent by the Hub according to the preset superframe structure, wherein the preset superframe structure includes three phases, the first phase includes a first beacon period, a first timeslot period and a second timeslot period, the first timeslot period being used by Sensors to send an emergency service and the second timeslot period being used by Sensors to send an ordinary service; the second phase includes a second beacon period and a third timeslot period, the third timeslot period being used by Sensors to complementarily send a service; and the third phase includes a fourth timeslot period, the fourth timeslot period being used by Sensors to send a sleep application and/or an access application ⟋S402

INFORMATION INTERACTION METHOD, DEVICE AND SYSTEM FOR WIRELESS BODY AREA NETWORK (WBAN)

TECHNICAL FIELD

The present disclosure relates to the field of communication, and particularly to an information interaction method, device and system for a WBAN.

BACKGROUND

Wireless Body Area Network (WBAN), as a branch of wireless communication, consists of nodes distributed on a surface of a human body or inside a human body and a personal terminal. By the WBAN, the human body can communicate with external electronic equipment such as a mobile phone, and information of the human body can further be finally sent to a destination such as a hospital by virtue of another network such as a Wireless Fidelity (WIFI) network and a 3rd-Generation (3G) network. The WBAN may be applied to many fields such as recreational activities, physical activities and the military field, but what motivates the rise of the WBAN most is its application to the field of medical services. Along with the improvement of the living standard of people and more pursuits of health, application of the WBAN to the field of medical services will be widely developed.

In the field of medical services, a WBAN provides a method for monitoring a health condition of a human body for a long time under without causing any influence to normal life of people. Since nodes are located on a human body and some nodes such as a blood pressure information acquisition node are even required to be implanted into the human body, there are many requirements raised on the WBAN. First, the nodes in the WBAN are required to be small in size, light in weight and easy for the human body to wear. Second, since the nodes are required to work for a long time, the power consumption of the nodes is required to be as low as possible.

Energy of a node is mainly consumed to the communication between the node and a personal terminal, so that it is very necessary and practically significant to propose a low-power-consumption Media Access Control (MAC) layer protocol.

In a related technology, an efficient MAC layer protocol for the WBAN is proposed. This protocol proposes two efficient methods: flexible timeslot allocation and reduction in the number of switching times of wireless receiving and sending. In addition, a MAC method for a WBAN is also proposed in the related technology. This method has the following characteristics: a node is made to enter a sleep mode more frequently; and communication robustness is enhanced.

Figure 1:
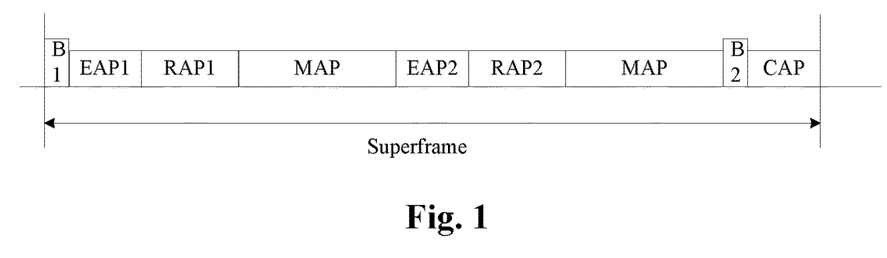
FIG. 1 is a schematic diagram of a frame structure specified in the WBAN protocol in IEEE according to the related technology.

The Institute of Electrical and Electronic Engineers (IEEE) proposes a WBAN protocol. FIG. 1 is a schematic diagram of a frame structure specified in the WBAN protocol in IEEE according to the related technology. The structure of the WBAN frame, shown in FIG. 1, has some shortcomings. First, Random Access Period (RAP) is an ordinary service, but adopts a Carrier Sense Multiple Access with Collision Avoidance (CAMS/CA) access manner. Since most of nodes periodically acquire physical sign information of a human body, traffic of respective nodes is relatively stable, which makes adoption of CSMA/CA questionable. Second, in IEEE, if a node fails to access a channel in Exclusive Access Phase (EAP) and RAP or the node still has a service, a Management Access Phase (MAP) may also be adopted for sending. MAP runs in Scheduling and Polling manners. The Polling manner can achieve collision avoidance. However, MAP requires a Hub and the node (e.g, sensor) to perform a series of "queries-responses", and such as process causes additional interaction consumption. Moreover, Polling is performed according to a certain sequence, when the Hub polls a certain node, if this node makes an application to the Hub for a relatively longer timeslot resource through an Acknowledgement (ACK) response, and those nodes which have not yet been polled may apply for relatively fewer timeslots (because the length of MAP is fixed), so that fairness may not be guaranteed. Third, in IEEE, a beacon frame 2 (Beacon2, which is B2 in the figure) only serves to mark a beginning of a Contention Access Phase (CAP), and the function of the beacon frame 2 may further be developed.

For a problem existing in a signaling transmission structure of a WBAN in the related technology, there is yet no effective solution.

SUMMARY

The embodiments of the present disclosure provide an information interaction method, device and system for a WBAN, so as to at least solve a problem existing in a signaling transmission structure of a WBAN in the related technology.

According to an embodiment of the present disclosure, an information interaction method for a WBAN is provided, which may include that: a Hub sends beacon frames to nodes (e.g., sensors) according to a preset superframe structure and receives, according to the preset superframe structure, information sent by the nodes, wherein the preset superframe structure may include three phases, the first phase may include a first beacon period, a first timeslot period and a second timeslot period, the first timeslot period being used by nodes to send an emergency service and the second timeslot period being used by nodes to send an ordinary service; the second phase may include a second beacon period and a third timeslot period, the third timeslot period being used by nodes to complementarily send a service; and the third phase may include a fourth timeslot period, the fourth timeslot period being used by nodes to send a sleep application and/or an access application.

In the embodiment, the step that the Hub sends the beacon frames to the nodes according to the preset superframe structure and receives, according to the preset superframe structure, the information sent by the nodes may include that: the Hub issues, through a first beacon frame in the first beacon period, to nodes which access a network, a determined number of timeslots required in the first timeslot period used by the nodes to send the emergency service and timeslots allocated to a respective node in the second timeslot period used by the nodes to send the ordinary service.

In the embodiment, the step that the Hub sends the beacon frames to the nodes according to the preset superframe structure and receives, according to the preset superframe structure, the information sent by the nodes may include that: the Hub receives, in the first timeslot period, an emergency service sent by the nodes.

In the embodiment, the step that the Hub sends the beacon frames to the nodes according to the preset superframe structure and receives, according to the preset superframe structure, the information sent by the nodes may include that: the Hub receives, in the second timeslot period, a Time Division Multiple Access (TDMA)-based ordinary service sent by the nodes, and/or, acquires, in the second timeslot period, application information for additional timeslots from the nodes.

In the embodiment, the step that the Hub acquires the application information for additional timeslots from the nodes may include at least one of the following steps that: the Hub receives application information, in which a service type is marked as an emergency service, from the nodes, wherein the application information may include the number of required timeslots; the Hub determines service sending failures of the nodes, sends Negative Acknowledgement (NACK) signals to the nodes, and deems that the nodes send application information in which a service type is marked as a service failed to be sent, wherein the number of required timeslots may be the number of timeslots of the service failed to be sent; and the Hub receives application information, in which a service types is marked as other ordinary service, from the nodes, wherein the application information may include the number of required timeslots.

In the embodiment, after the step that the Hub receives the TDMA-based ordinary service sent by the nodes, and/or, acquires the application information for additional timeslots from the nodes, the method may further include that: the Hub sends response information to the nodes, wherein the response information may include one of: an ACK and an instruction OFF of not switching on wireless communication in the second beacon period, which are sent to the nodes under a condition that the Hub successfully receives the information sent by the nodes and the nodes do not apply for the additional timeslots; an ACK and an instruction ON of switching on wireless communication in the second beacon period, which are sent to the nodes under a condition that the Hub successfully receives the information sent by the nodes and the nodes apply for the additional timeslots; and a NACK and an instruction ON of switching on wireless communication in the second beacon period, which are sent to the nodes under a condition that the Hub does not successfully receive the information sent by the nodes.

In the embodiment, the step that the Hub sends the beacon frames to the nodes according to the preset superframe structure and receives, according to the preset superframe structure, the information sent by the nodes may include that: the Hub issues, through a second beacon frame in the second beacon period, to nodes which access the network, the determined number of timeslots required in the third timeslot period and the determined number of timeslots required in the fourth timeslot period, as well as timeslots allocated in the third timeslot period to each node which applies for the additional timeslots.

In the embodiment, the operation that the Hub determines the number of the timeslots required in the third timeslot period and the number of the timeslots required in the fourth timeslot period may include that: when a total number of the additional timeslots for which the nodes apply in a current frame is more than m, and is m+a, if m+a≤k−2, the number of the timeslots in the third timeslot period is regulated to be m+a, and if m+a>k−2, the number of the timeslots in the third timeslot period is regulated to be k−2, and a total number of timeslots in the third timeslot period and the fourth timeslot period is regulated to be m+a+2 through a first beacon period in a next frame; and/or, when the total number of the additional timeslots for which the nodes apply in the current frame is smaller than m, the number of the timeslots in the fourth timeslot period is increased from n to n+b, wherein p may be set to be an average number of sleep nodes in the network, and if n+b>2p, the total number of the timeslots in the third timeslot period and the fourth timeslot period is regulated to be k−(n+b−2p) through the first beacon period in the next frame, wherein m may be the number of timeslots in a third timeslot period in a previous frame, n may be the number of timeslots in a fourth timeslot period in the previous frame, and k=m+n.

In the embodiment, the operation that the Hub allocates, in the third timeslot period, the timeslots to each node which applies for the additional timeslots may include that: the Hub allocates timeslots to nodes which apply for additional timeslots for sending an emergency service; after allocation of the additional timeslots for sending the emergency service is completed, the Hub allocates timeslots to nodes which apply for resending of a service failed to be sent; and after allocation of the additional timeslots for resending the service failed to be sent is completed, the Hub allocates timeslots to nodes which apply for continuing of sending of an ordinary service, wherein for a node to which no timeslots are allocated, the Hub may preferably allocate a timeslot to this node among nodes of the same type in the third timeslot period in the next frame.

In the embodiment, the step that the Hub sends the beacon frames to the nodes according to the preset superframe structure and receives, according to the preset superframe structure, the information sent by the nodes may include that: the Hub receives, in the third timeslot period, a service complementarily sent by the nodes.

In the embodiment, the step that the Hub sends the beacon frames to the nodes according to the preset superframe structure and receives, according to the preset superframe structure, the information sent by the nodes may include that: the Hub receives, in the fourth timeslot period, a sleep application and/or an access application sent by the nodes.

In the embodiment, after the step that the Hub receives the sleep application and/or the access application sent by the nodes, the method may further include that: the Hub does not allocate, in a second timeslot period in the next frame, timeslots to nodes which send the sleep application; and/or, the Hub allocates, in the second timeslot period in the next frame, timeslots to nodes which send the access application.

According to another embodiment of the present disclosure, an information interaction method for a WBAN is provided, which may include that: a node (e.g., sensor) sends information to a Hub according to a preset superframe structure and receives, according to the preset superframe structure, a beacon frame sent by the Hub, wherein the preset superframe structure may include three phases, the first phase may include a first beacon period, a first timeslot period and a second timeslot period, the first timeslot period being used by nodes to send an emergency service and the second timeslot period being used by nodes to send an ordinary service; the second phase may include a second beacon period and a third timeslot period, the third timeslot period being used by nodes to complementarily send a service; and the third phase may include a fourth timeslot period, the fourth timeslot period being used by nodes to send a sleep application and/or an access application.

In the embodiment, the step that the node sends the information to the Hub according to the preset superframe structure and receives, according to the preset superframe structure, the beacon frame sent by the Hub may include that: the node receives, in the first beacon period, a first beacon frame sent by the Hub to acquire the number of timeslots required in the first timeslot period used by nodes to send the emergency service and timeslots allocated to the current node in the second timeslot period used by nodes to send the ordinary service.

In the embodiment, the step that the node sends the information to the Hub according to the preset superframe structure and receives, according to the preset superframe structure, the beacon frame sent by the Hub may include that: the node judges, in the first timeslot period, whether the node has an emergency service to be sent or not; if the node has an emergency service to be sent, the node competes to access a channel, and sends the emergency service to the Hub; and if the node fails in the competition, the node marks that the node has an emergency service to be sent.

In the embodiment, the step that the node sends the information to the Hub according to the preset superframe structure and receives, according to the preset superframe structure, the beacon frame sent by the Hub may include that: the node sends an ordinary service in the second timeslot period according to timeslots issued by the Hub in the first beacon period and used by the current node to send a TDMA-based ordinary service, and/or, sends application information for additional timeslots in the second timeslot period.

In the embodiment, the step that the node sends the application information for the additional timeslots may include at least one of the following steps that: the node sends application information in which a service type is marked as an emergency service, wherein the application information may include the number of required timeslots; and the node sends application information in which a service type is marked as other ordinary service, wherein the application information may include the number of required timeslots.

In the embodiment, the step that the node sends the information to the Hub according to the preset superframe structure and receives, according to the preset superframe structure, the beacon frame sent by the Hub may include that: the node receives, in the second beacon period, a second beacon frame issued by the Hub to acquire the number of timeslots required in the third timeslot period and the number of timeslots required in the fourth timeslot period as well as timeslots allocated, in the third timeslot period, to the node which applies for additional timeslots.

In the embodiment, the step that the node sends the information to the Hub according to the preset superframe structure and receives, according to the preset superframe structure, the beacon frame sent by the Hub may include that: the node complementarily sends a service in the third timeslot period according to the timeslots issued by the Hub in the second beacon period and allocated to the node which applies for the additional timeslots.

In the embodiment, the step that the node sends the information to the Hub according to the preset superframe structure and receives, according to the preset superframe structure, the beacon frame sent by the Hub may include that: the node competes to access the channel and sends a sleep application and/or an access application to the Hub in the fourth timeslot period.

In the embodiment, after the step that the node competes to access the channel and sends the sleep application and/or the access application to the Hub, the method may further include that: if the node sends the sleep application to the Hub, the node enters a sleep state in a next frame; and/or, if the node sends the access application to the Hub, the node receives, in a first beacon period of the next frame, timeslots allocated to the node by the Hub.

According to another embodiment of the present disclosure, an information interaction device for a WBAN is also provided, which may be located in a Hub, including: a first sending module, arranged to send beacon frames to nodes (e.g., sensors) according to a preset superframe structure; and a first receiving module, arranged to receive, according to the preset superframe structure, information sent by the nodes, wherein the preset superframe structure may include three phases, the first phase may include a first beacon period, a first timeslot period and a second timeslot period, the first timeslot period being used by nodes to send an emergency service and the second timeslot period being used by nodes to send an ordinary service; the second phase may include a second beacon period and a third timeslot period, the third timeslot period being used by nodes to complementarily send a service; and the third phase may include a fourth timeslot period, the fourth timeslot period being used by nodes to send a sleep application and/or an access application.

According to another embodiment of the present disclosure, an information interaction device for a WBAN is also provided, which may be located in a node (e.g., sensor), including: a second sending module, arranged to send information to a Hub according to a preset superframe structure; and a second receiving module, arranged to receive, according to the preset superframe structure, a beacon frame sent by the Hub, wherein the preset superframe structure may include three phases, the first phase may include a first beacon period, a first timeslot period and a second timeslot period, the first timeslot period being used by nodes to send an emergency service and the second timeslot period being used by nodes to send an ordinary service; the second phase may include a second beacon period and a third timeslot period, the third timeslot period being used by nodes to complementarily send a service; and the third phase may include a fourth timeslot period, the fourth timeslot period being used by nodes to send a sleep application and/or an access application.

According to another embodiment of the present disclosure, an information interaction system for a WBAN is also provided, which may include the abovementioned information interaction device, located in a Hub, for the WBAN and may further include the abovementioned information interaction device, located in a node (e.g., sensor), for the WBAN.

According to the embodiments of the present disclosure, the Hub sends the beacon frames to the nodes according to the preset superframe structure and receives, according to the preset superframe structure, the information sent by the nodes, wherein the preset superframe structure includes the three phases, the first phase includes the first beacon period, the first timeslot period and the second timeslot period, the first timeslot period being used by nodes to send an emergency service and the second timeslot period being used by nodes to send an ordinary service; the second phase includes the second beacon period and the third timeslot period, the third timeslot period being used by the nodes to complementarily send a service; and the third phase includes the fourth timeslot period, the fourth timeslot period being used by the nodes to send a sleep application and/or an access application. A problem existing in a signaling transmission structure of the WBAN in the related technology is solved. On the premise of ensuring that a packet successfully accesses the channel, a probability of a sending failure is reduced to a great extent, the timeslots are utilized to a greater extent, exemplary transmission of the emergency services is ensured as much as possible, and meanwhile, energy consumption of the nodes and the network is reduced.

BRIEF DESCRIPTION OF THE DRAWINGS

The drawings described here are adopted to provide further understanding of the present disclosure, and form a part of the present disclosure. Schematic embodiments of the present disclosure and descriptions thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 2:
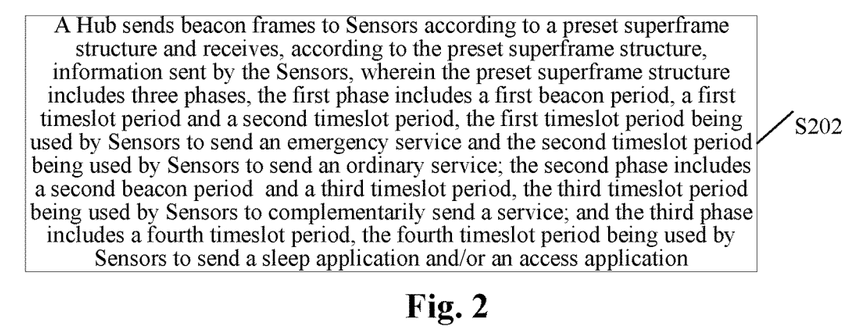
FIG. 2 is a flowchart of an information interaction method for a WBAN according to an embodiment of the present disclosure.

Considering the abovementioned problem, the embodiment provides an information interaction method for a WBAN. FIG. 2 is a flowchart of an information interaction method for a WBAN according to an embodiment of the present disclosure. As shown in FIG. 2, the method includes the following step.

Step S202: a Hub sends beacon frames to nodes (e.g., sensors) according to a preset superframe structure and receives, according to the preset superframe structure, information sent by the nodes.

In the embodiment, the preset superframe structure includes three phases. The first phase includes a first beacon period (embodied as B1 hereinafter), a first timeslot period (embodied as EAP hereinafter) and a second timeslot period (embodied as MAP1 hereinafter), the first timeslot period is used by nodes to send an emergency service and the second timeslot period is used by nodes to send an ordinary service. The second phase includes a second beacon period (embodied as B2 hereinafter) and a third timeslot period (embodied as MAP2 hereinafter), and the third timeslot period is used by nodes to complementarily send a service. The third phase includes a fourth timeslot period (embodied as CAP hereinafter), and the fourth timeslot period is used by nodes to send a sleep application and/or an access application.

By the step of the embodiment, the Hub performs information interaction with the nodes according to the abovementioned superframe structure, and an idea that the first phase is complemented with the second phase is adopted. By virtue of the technical solution, a problem existing in a signaling transmission structure of the WBAN in the related technology is solved. On the premise of ensuring that a packet successfully accesses a channel, a probability of a sending failure is reduced to a great extent, timeslots are utilized to a greater extent, exemplary transmission of the emergency services is ensured as much as possible, and meanwhile, energy consumption of the nodes and a network is reduced.

In the embodiment, the Hub issues, through a first beacon frame in the first beacon period, to nodes which access a network, a determined number of timeslots required in the first timeslot period used by nodes to send the emergency service and timeslots allocated to a respective node in the second timeslot period used by nodes to send the ordinary service.

In the embodiment, the Hub receives, in the first timeslot period, an emergency service sent by the nodes.

In the embodiment, the Hub receives, in the second timeslot period, a TDMA-based ordinary service sent by the nodes, and/or, acquires, in the second timeslot period, application information for additional timeslots from the nodes.

In the embodiment, the operation that the Hub acquires the application information for additional timeslots from the nodes may include at least one of the following process. The Hub receives application information, in which a service type is marked as "emergency service", from the nodes, and the application information includes the number of required timeslots. The Hub determines service sending failures of the nodes, sends NACK signals to the nodes, and deems that the nodes send application information in which a service type is marked as "service failed to be sent", and the number of required timeslots is the number of timeslots of the service failed to be sent. The Hub receives application information, in which a service type is marked as "other ordinary service", from the nodes, and the application information includes the number of required timeslots.

In the embodiment, after the Hub receives the TDMA-based ordinary service sent by the nodes, and/or, acquires the application information for additional timeslots from the nodes, the Hub may further send response information to the nodes. The response information may include one of the following information.

An ACK and an instruction OFF of not switching on wireless communication in the second beacon period (i.e. an instruction indicating wireless communication to be switched off in the second beacon period), which are sent to the nodes under a condition that the Hub successfully receives the information sent by the nodes and the nodes do not apply for the additional timeslots.

An ACK and an instruction ON of switching on wireless communication in the second beacon period (i.e. an instruction indicating wireless communication to be switched on in the second beacon period), which are sent to the nodes under a condition that the Hub successfully receives the information sent by the nodes and the nodes apply for the additional timeslots.

A NACK and an instruction ON of switching on wireless communication in the second beacon period (i.e. the instruction indicating wireless communication to be switched on in the second beacon period), which are sent to the nodes under a condition that the Hub does not successfully receive the information sent by the nodes.

Considering that a beacon frame 2 (Beacon2, which is B2 in the figure) in the related technology only serves to mark a beginning of a CAP phase, and the function of the Beacon2 may further be developed. For example, the Hub may acquire a substantial condition of a current channel according to performance (including the number of successful transmissions, whether there is still a service request or not and the like) of the nodes in EAP, RAP and MAP phases, arrange other parts in a current frame more reasonably and issue new Scheduling through Beacon2.

Based on the abovementioned consideration, in the embodiment, the Hub issues, through a second beacon frame in the second beacon period, to nodes which access the network, the determined number of timeslots required in the third timeslot period and the determined number of timeslots required in the fourth timeslot period, as well as timeslots allocated in the third timeslot period to each node which applies for the additional timeslots.

As an exemplary implementation, the operation that the Hub determines the number of the timeslots required in the third timeslot period and the number of the timeslots required in the fourth timeslot period may include that: when a total number of the additional timeslots for which the nodes apply in a current frame is more than m, and is m+a, if m+a≤k−2, the number of the timeslots in the third timeslot period is regulated to be m+a, and if m+a>k−2, the number of the timeslots in the third timeslot period is regulated to be k−2, and a total number of timeslots in the third timeslot period and the fourth timeslot period is regulated to be m+a+2 through a first beacon period in a next frame; and/or, when the total number of the additional timeslots for which the nodes apply in the current frame is smaller than m, the number of the timeslots in the fourth timeslot period is increased from n to n+b, where p is set to be an average number of sleep nodes in the network, and if n+b>2p, the total number of the timeslots in the third timeslot period and the fourth timeslot period is regulated to be k−(n+b−2p) through the first beacon period in the next frame.

In the above embodiment, m is the number of timeslots in a third timeslot period in a previous frame, n is the number of timeslots in a fourth timeslot period in the previous frame, k=m+n, and b is the number of timeslots which are added in the fourth timeslot period.

As an exemplary implementation, the operation that the Hub allocates, in the third timeslot period, the timeslots to each node which applies for the additional timeslots may include the following process.

The Hub allocates timeslots to nodes which apply for additional timeslots for sending an emergency service at first (i.e. the abovementioned nodes which apply to mark the service types as "emergency service"). After allocation of the additional timeslots for sending the emergency service is completed, the Hub allocates timeslots to nodes which apply for resending of a service failed to be sent (i.e. the abovementioned nodes which apply to mark the service types as "service failed to be sent"). After allocation of the additional timeslots for resending the service failed to be sent is completed, the Hub allocates timeslots to nodes which apply for continuing of sending of an ordinary service (i.e. the abovementioned nodes which apply to mark the service types as "other ordinary service"). For a node to which no timeslots are allocated, the Hub preferably allocates a timeslot to this node among nodes of the same type in the third timeslot period in the next frame. For example, if no timeslots are allocated to a node corresponding to the type of "other ordinary service", a timeslot allocated, in the third timeslot period of the next frame, to the type of "other ordinary service" is preferably allocated to this node for sending. If no timeslots are allocated to a node corresponding to the type of "service failed to be sent", a timeslot allocated, in the third timeslot period of the next frame, to the type of "service failed to be sent" is preferably allocated to this node for sending. The same operation is performed for the type of "emergency service".

In the embodiment, the Hub receives, in the third timeslot period, a service complementarily sent by the nodes.

In the embodiment, the Hub receives, in the fourth timeslot period, a sleep application and/or an access application sent by the nodes.

As an exemplary implementation, after the Hub receives the sleep application and/or the access application sent by the nodes, the Hub does not allocate, in a second timeslot period in the next frame, timeslots to nodes which send the sleep application; and/or, the Hub allocates, in the second timeslot period in the next frame, timeslots to nodes which send the access application.

Corresponding to the abovementioned information interaction method for the WBAN, the embodiment also provides an information interaction device for the WBAN, which is located in a Hub, the device is arranged to implement the abovementioned embodiment and exemplary implementation modes, and what has been described will not be elaborated. For example, term "module", used below, may implement a combination of software and/or hardware with preset functions. Although the device described in the following embodiment is preferably implemented with software, implementation with hardware or a combination of the software and the hardware is also possible and conceivable.

Figure 3:
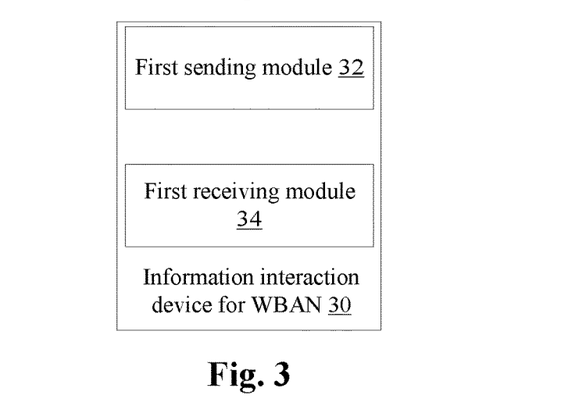
FIG. 3 is a structure block diagram of an information interaction device for a WBAN according to an embodiment of the present disclosure.

FIG. 3 is a structure block diagram of an information interaction device 30 for a WBAN according to an embodiment of the present disclosure. As shown in FIG. 3, the device 30 includes a first sending module 32 and a first receiving module 34. Each module will be described below in detail.

The first sending module 32 is arranged to send beacon frames to nodes according to a preset superframe structure. The first receiving module 34 is arranged to receive, according to the preset superframe structure, information sent by the nodes. The preset superframe structure includes three phases. The first phase includes a first beacon period (embodied as B1 hereinafter), a first timeslot period (embodied as EAP hereinafter) and a second timeslot period (embodied as MAP1 hereinafter), the first timeslot period is used by nodes to send an emergency service and the second timeslot period is used by nodes to send an ordinary service. The second phase includes a second beacon period (embodied as B2 hereinafter) and a third timeslot period (embodied as MAP2 hereinafter), and the third timeslot period is used by nodes to complementarily send a service. The third phase includes a fourth timeslot period (embodied as CAP hereinafter), and the fourth timeslot period is used by nodes to send a sleep application and/or an access application.

Figure 4:
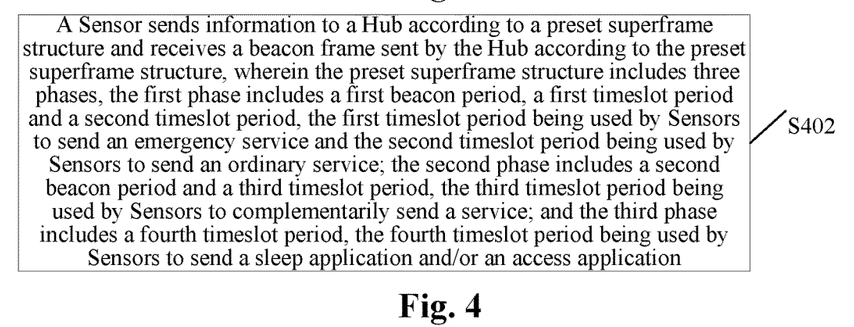
FIG. 4 is a flowchart of another information interaction method for a WBAN according to an embodiment of the present disclosure.

The embodiment also provides another information interaction method for a WBAN. FIG. 4 is a flowchart of another information interaction method for a WBAN according to an embodiment of the present disclosure. As shown in FIG. 4, the method includes the following step.

Step S402: a node (e.g., sensor) sends information to a Hub according to a preset superframe structure and receives, according to the preset superframe structure, a beacon frame sent by the Hub.

The preset superframe structure includes three phases. The first phase includes a first beacon period, a first timeslot period and a second timeslot period, the first timeslot period is used by nodes to send an emergency service and the second timeslot period is used by nodes to send an ordinary service. The second phase includes a second beacon period and a third timeslot period, and the third timeslot period is used by nodes to complementarily send a service. The third phase includes a fourth timeslot period, and the fourth timeslot period is used by nodes to send a sleep application and/or an access application.

In the embodiment, the node receives, in the first beacon period, a first beacon frame sent by the Hub to acquire the number of timeslots required in the first timeslot period used by nodes to send the emergency service and timeslots allocated to the current node in the second timeslot period used by nodes to send the ordinary service.

In the embodiment, the node judges, in the first timeslot period, whether the node has an emergency service to be sent or not; if the node has an emergency service to be sent, the node competes to access a channel, and sends the emergency service to the Hub; and if the node fails in the competition, the node marks that the node has an emergency service to be sent.

In the embodiment, the node sends an ordinary service in the second timeslot period according to timeslots issued by the Hub in the first beacon period and used by the current node to send a TDMA-based ordinary service, and/or, sends application information for additional timeslots in the second timeslot period.

As an exemplary implementation, the operation that the node sends the application information for the additional timeslots may include at least one of the following process. The node sends application information in which a service type is marked as an emergency service, and the application information may include the number of required timeslots. The node sends application information in which a service type is marked as other ordinary service, and the application information may include the number of required timeslots.

In the embodiment, the node receives, in the second beacon period, a second beacon frame issued by the Hub to acquire the number of timeslots required in the third timeslot period and the number of timeslots required in the fourth timeslot period as well as timeslots allocated, in the third timeslot period, to the node which applies for additional timeslots.

In the embodiment, the node complementarily sends a service in the third timeslot period according to the timeslots issued by the Hub in the second beacon period and allocated to the node which applies for the additional timeslots.

In the embodiment, the node competes to access the channel in the fourth timeslot period and sends a sleep application and/or an access application to the Hub in the fourth timeslot period.

As an exemplary implementation, after the node competes to access the channel and sends the sleep application and/or the access application to the Hub, if the node sends the sleep application to the Hub, the node enters a sleep state in a next frame; and/or, if the node sends the access application to the Hub, the node receives, in a first beacon period of the next frame, timeslots allocated to the node by the Hub.

Figure 5:
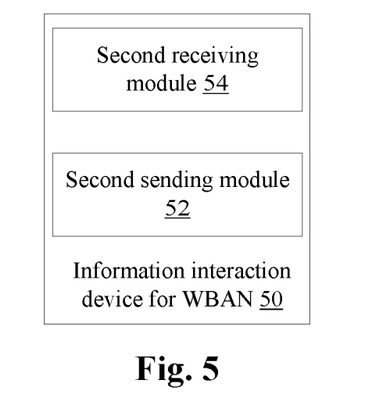
FIG. 5 is a structure block diagram of another information interaction device for a WBAN according to an embodiment of the present disclosure.

Corresponding to the other information interaction method for the WBAN, the embodiment also provides another information interaction device for a WBAN, which is located in a node. FIG. 5 is a structure block diagram of another information interaction device 50 for a WBAN according to an embodiment of the present disclosure. As shown in FIG. 5, the device 50 includes a second sending module 52 and a second receiving module 54. Each module will be described below in detail.

The second sending module 52 is arranged to send information to a Hub according to a preset superframe structure; and the second receiving module 54 is arranged to receive, according to the preset superframe structure, a beacon frame sent by the Hub. The preset superframe structure includes three phases. The first phase includes a first beacon period, a first timeslot period and a second timeslot period, the first timeslot period is used by nodes to send an emergency service and the second timeslot period is used by nodes to send an ordinary service. The second phase includes a second beacon period and a third timeslot period, and the third timeslot period is used by nodes to complementarily send a service. The third phase includes a fourth timeslot period, and the fourth timeslot period is used by nodes to send a sleep application and/or an access application.

Figure 6:
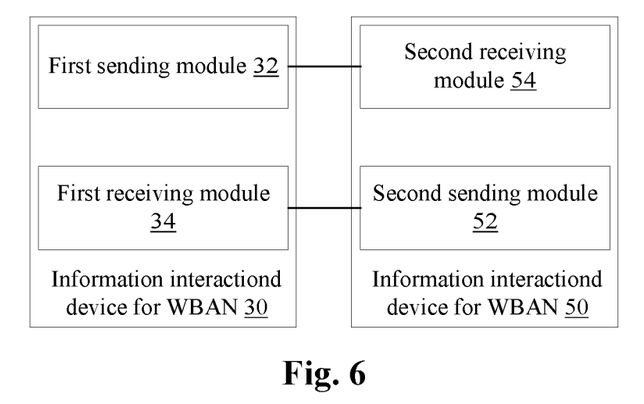
FIG. 6 is a structure block diagram of an information interaction system for a WBAN according to an embodiment of the present disclosure.

The embodiment also provides an information interaction system for a WBAN. FIG. 6 is a structure block diagram of an information interaction system for a WBAN according to an embodiment of the present disclosure. As shown in FIG. 6, the system includes an information interaction device 30, shown in FIG. 3 and located in the Hub, for the WBAN, and further includes an information interaction device 50, shown in FIG. 5 and located in a node, for the WBAN.

Descriptions will be made below with reference to an exemplary embodiment, and the following exemplary embodiment combines the abovementioned embodiment and exemplary implementation modes thereof.

In the following exemplary embodiment, a WBAN MAC method capable of implementing efficient utilization of timeslots is provided. The method is based on IEEE. On the premise of ensuring that a packet successfully accesses a channel, a probability of a sending failure is reduced to a great extent, the timeslots are utilized to a greater extent, exemplary transmission of emergency services is ensured as much as possible, and meanwhile, energy consumption of nodes and a network is reduced.

According to the efficient WBAN MAC method provided by the exemplary embodiment, a complementary sending method is adopted. The following steps are specifically included in the complementary sending method. A first beacon frame B1 is sent; a node competes to access a channel for emergency service transmission; a TDMA-manner-based ordinary service is transmitted, and in this period, the node simultaneously sends an additional timeslot application; timeslots occupied by subsequent MAP2 and CAP are planned during a beacon frame B2 according to the application information for additional timeslots received from the node, and a timeslot in MAP2 is allocated to the corresponding node; the corresponding node sends an additional service during the timeslot period MAP2; and in the timeslot period CAP, the node applies to sleep, and a new node or a sleep node accesses the network. According to the method of the exemplary embodiment, the timeslots are reallocated by complementary sending, so that communication robustness is enhanced, the timeslots are more compact, and existence of unnecessary timeslots is reduced. Meanwhile, compared with IEEE, the method adopts a TDMA manner for service transmission more often. In addition, the node is in a communication state less, so that power consumption is reduced.

Figure 7:
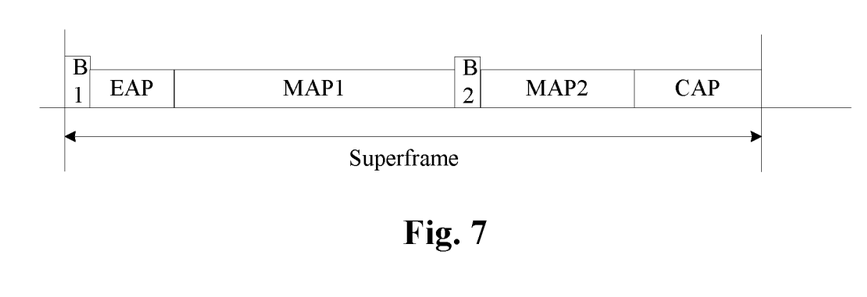
FIG. 7 is a schematic diagram of a superframe structure specified in the WBAN protocol according to an exemplary embodiment of the present disclosure.

Descriptions will be made below with a star topological network as an example, and the network is formed by a Hub and different nodes (e.g., sensors). An improved method is proposed in the exemplary embodiment on the basis of an original superframe. FIG. 7 is a schematic diagram of a superframe structure specified in the WBAN protocol according to an exemplary embodiment of the present disclosure. As shown in FIG. 7, a superframe is defined into three phases. The first phase is a phase where the nodes normally send services, includes a beacon period and two different timeslot periods (i.e., EAP and MAP1), and the two timeslot periods are configured to send emergency services and ordinary services respectively. The second phase is a phase where services are complementarily sent, the emergency services and the ordinary services failed to be sent in the first phase and additional services are sent in this phase, and this phase includes a beacon period and a timeslot period (embodied as MAP2). The third phase is a period where new nodes and sleep nodes are processed, and this phase includes a timeslot period (embodied as CAP).

A complementary sending method is adopted in the exemplary embodiment. Timeslots of the second phase are reasonably regulated according to a sending condition of the first phase, so that the first phase is complemented with the second phase, communication robustness is improved, and the timeslots are fully utilized. A working flow implemented by the complementary sending method adopted in the exemplary embodiment will be described in detail as follows.

Step 1: a beacon frame B1 is sent.

The Hub allocates timeslots to each node according to a number of nodes which access a network and sampling rate information of the corresponding nodes, and determines the number of timeslots required by the period EAP when the emergency services are processed. The Hub sends, through the beacon frame B1, the information to nodes which access the network. The information specifically includes synchronous information, the number of timeslots occupied by EAP and the number of timeslots occupied by MAP1.

Correspondingly, the nodes which access the network switch on wireless communication in this period, receive the information, and calculate next time when wireless communication is switched on according to the received information. A calculation method is that: 1: if timeslots have been allocated to them, wireless communication is switched on in the corresponding timeslots; and 2: if the timeslots have not been allocated to them, wireless communication is switched on at the beginning of a next frame.

Step 2: emergency services are transmitted.

In processes of acquiring information of a human body, the nodes may encounter a phenomenon of sudden change of some information, such as sudden rise of an acquired blood pressure signal, and information like this may be defined as emergency services. In the frame structure proposed in the exemplary embodiment, the EAP period is configured to process the emergency services. In this period, the nodes compete to access a channel, and the Hub communicates with nodes which access the channel, and receives the emergency services.

Correspondingly, in this period, each node judges whether the node has an emergency service to be sent or not, and if the node has an emergency service to be sent, switches on wireless communication and competes with the other nodes to access the channel. In case of successful access, information is sent; and if not successfully accessing the channel in the whole EAP period, the node marks itself to "have the emergency service to be sent" (the emergency service will be sent in the subsequent phase).

Step 3: TDMA-based ordinary services are transmitted.

Each node judges whether the timeslot allocated to it has come or not, and if NO, wireless communication is in an off state; and if the allocated timeslot has come, the node switches on wireless communication, and sends information. The sent information includes application information for an additional timeslot, besides sampling information.

The application information for the additional timeslot is explained as follows. 1: for a node, if the node has an emergency service which is not successfully sent or an emergency service which is temporarily generated in the EAP period, application information sent by the node marks a service type as "emergency service", and includes a number of required timeslots. 2: if the node receives a NACK signal returned by the Hub after sending an ordinary service, it is indicated that the service is failed to be sent, the node may not send any application information here, but the Hub has known about the number of timeslots adopted when the node fails to send the service, which is equivalent that the node sends the application information, the service type being "service failed to be sent". 3: if the node still has additional information which has yet not been sent at the end of the timeslot allocated to it, the application information sent by the node marks the service type as "other ordinary service", and includes a number of required timeslots.

After a node completes to send the information, the Hub should return information corresponding to the node. The information consists of two instructions, i.e. an instruction (embodied as ACK/NACK) indicating whether the information is received or not and an instruction (embodied as ON/OFF) indicating whether to switch on wireless communication in a timeslot period B2 or not. 1: if the Hub successfully receives the information sent by the node and the node does not apply for any additional timeslot, ACK and OFF are returned to the node. 2: if the Hub successfully receives the information sent by the node and the node has applied for an additional timeslot, ACK and ON are returned to the node. 3: if the Hub does not receive the information sent by the node, NACK and ON are returned to the node, which indicates that the node is required to resend the information in a subsequent timeslot period.

Step 4: a beacon frame B2 is sent.

For a certain node, if it has applied for an additional timeslot, a receiver is switched on in B2, otherwise wireless communication is switched off. In the timeslot period B2, the Hub is required to complete two tasks: 1, the numbers of the timeslots occupied respectively by MAP2 and CAP are planned; and 2: the timeslots of MAP2 are allocated to related nodes, and timeslot allocation information is issued.

It may be specified that the numbers of the timeslots occupied by MAP2 and CAP may be regulated, but a sum thereof has been fixed at the beginning of a frame, and may be regulated in different frames. Therefore, in B2, the Hub is required to calculate how to allocate certain numbers of timeslots to MAP2 and CAP. An algorithm is as follows.

First, it is supposed that, in a previous frame, the number of timeslots of MAP2 is m, the number of timeslots of CAP is n, and m+n=k.

1: If the number of the timeslots required in MAP2 in the current frame is more than m (a total number of additional timeslots for which the nodes apply is more than m), the number of the timeslots occupied by MAP2 is increased according to a requirement, and if the number of the timeslots is increased from m to m+a, the requirement may be met. If m+a≤k−2, the number of the timeslots occupied by MAP2 is regulated to be m+a; and if m+a>k−2, the number of the timeslots occupied by MAP2 is regulated to be k−2, and a total number of timeslots occupied by MAP2 and CAP is regulated to be m+a+2 through B1 in a next frame.

2: If the number of the timeslots required in MAP2 in the current frame is smaller than m, the number of the timeslots occupied by MAP2 is decreased, the number of the timeslots occupied by CAP is increased, and it is supposed that the number of the timeslots occupied by the CAP is increased from n to n+b. p is set to be an average number of sleep nodes in the network, and if n+b>2p, the total number of the timeslots occupied by MAP2 and CAP is regulated to be k−(n+b−2p) through B1 in the next frame.

After completing allocation of the timeslots of MAP2 and CAP, the Hub is required to allocate the timeslots of MAP2 to the corresponding nodes. An allocation method is as follows.

If the currently allocated number of the timeslots occupied by MAP2 may meet all the applications for additional timeslots, the timeslots are sequentially allocated to the corresponding nodes according to "emergency service", "service failed to be sent" and "other ordinary service". If the currently allocated number of the timeslots occupied by MAP may not meet all the applications for additional timeslots, timeslots are allocated to nodes corresponding to the type of "emergency service" and then the type of "service failed to be sent" and finally nodes corresponding to the type of "other ordinary service". For a node to which no timeslots are allocated, the Hub rises its priority, and allocates a timeslot to it in MAP2 of the next frame. The priority is for the same service type, that is, a priority of "emergency service" is higher than the type of "service failed to be sent", and a priority of "service failed to be sent" is higher than the type of "other ordinary service".

Step 5: TDMA-based complementary services are transmitted.

Processes for MAP2 and MAP1 are substantially the same, and the Hub sequentially communicates with the corresponding nodes. A difference is that the nodes only send service information and do not send any application information for additional timeslots in MAP2.

Step 6: new nodes or sleep nodes access a network.

During a practical application, there may always be new nodes required to access the network. In addition, due to different sampling rates of nodes, some nodes with low sampling rates are not required to send information in each frame, and power consumption may be reduced in a manner of making them sleep. The sleep nodes are required to re-access the network when sending information. The last timeslot period CAP in the superframe is configured to process transmission requirements of the new nodes and the sleep nodes. It can be seen that CAP is ensured to occupy at least two timeslots in the algorithm in Step 4.

In the timeslot period CAP, the nodes adopt a competition access manner. If being required to sleep, a node accessing the network may switch on wireless communication to sense the channel to compete for access in this period, send a sleep application to the Hub after successful access, and enter a sleep state in the next frame after obtaining permission. A new node or a sleep node required to re-access the network also switches on wireless communication to compete for access, sends access application information to the Hub after successful access, and participates in a communication process in the next frame after obtaining a permission, and correspondingly, the Hub may allocate a timeslot to it during B1 in the next frame.

Figure 8:
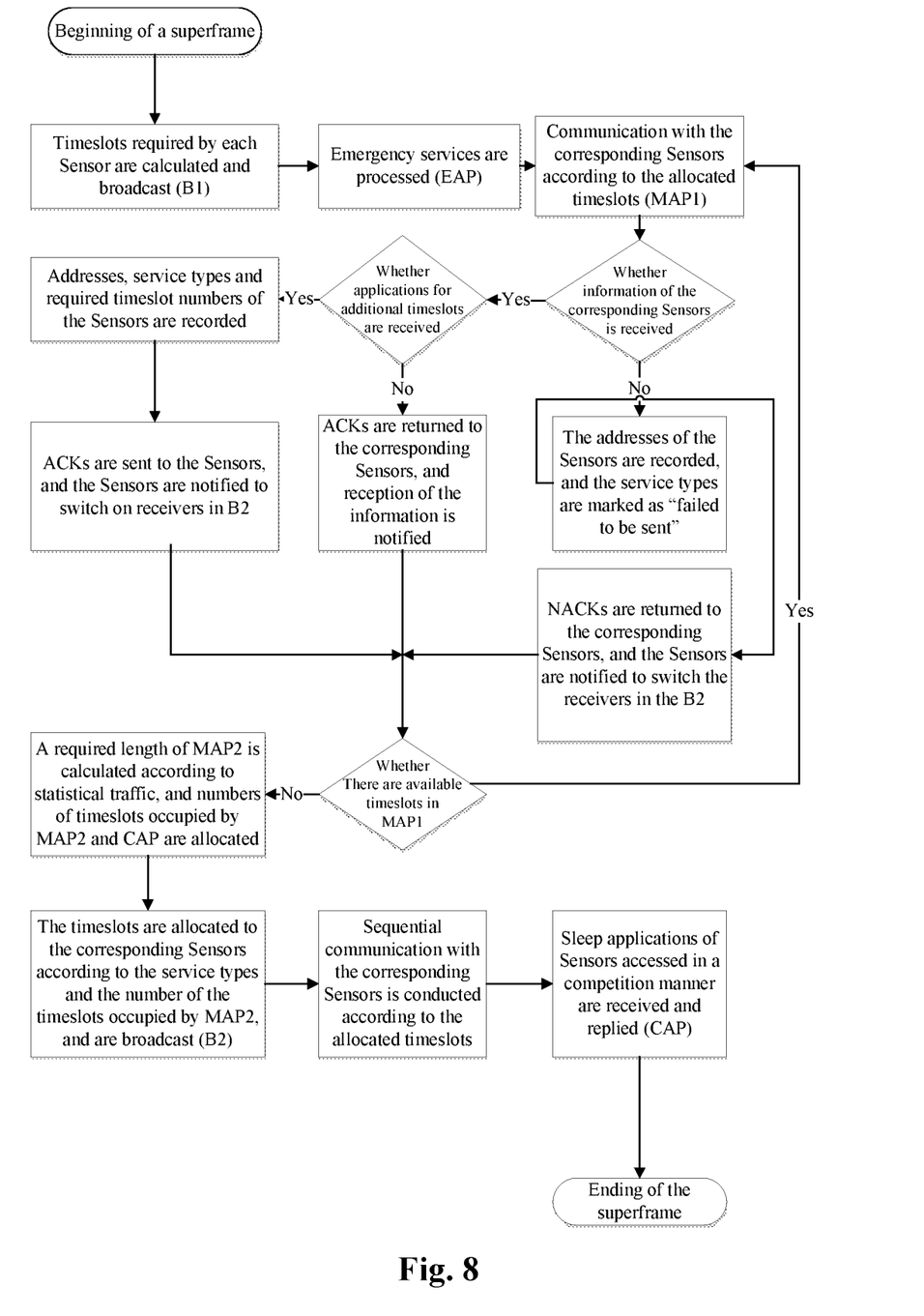
FIG. 8 is a working flowchart of a Hub in a superframe according to an exemplary embodiment of the present disclosure.
Figure 9:
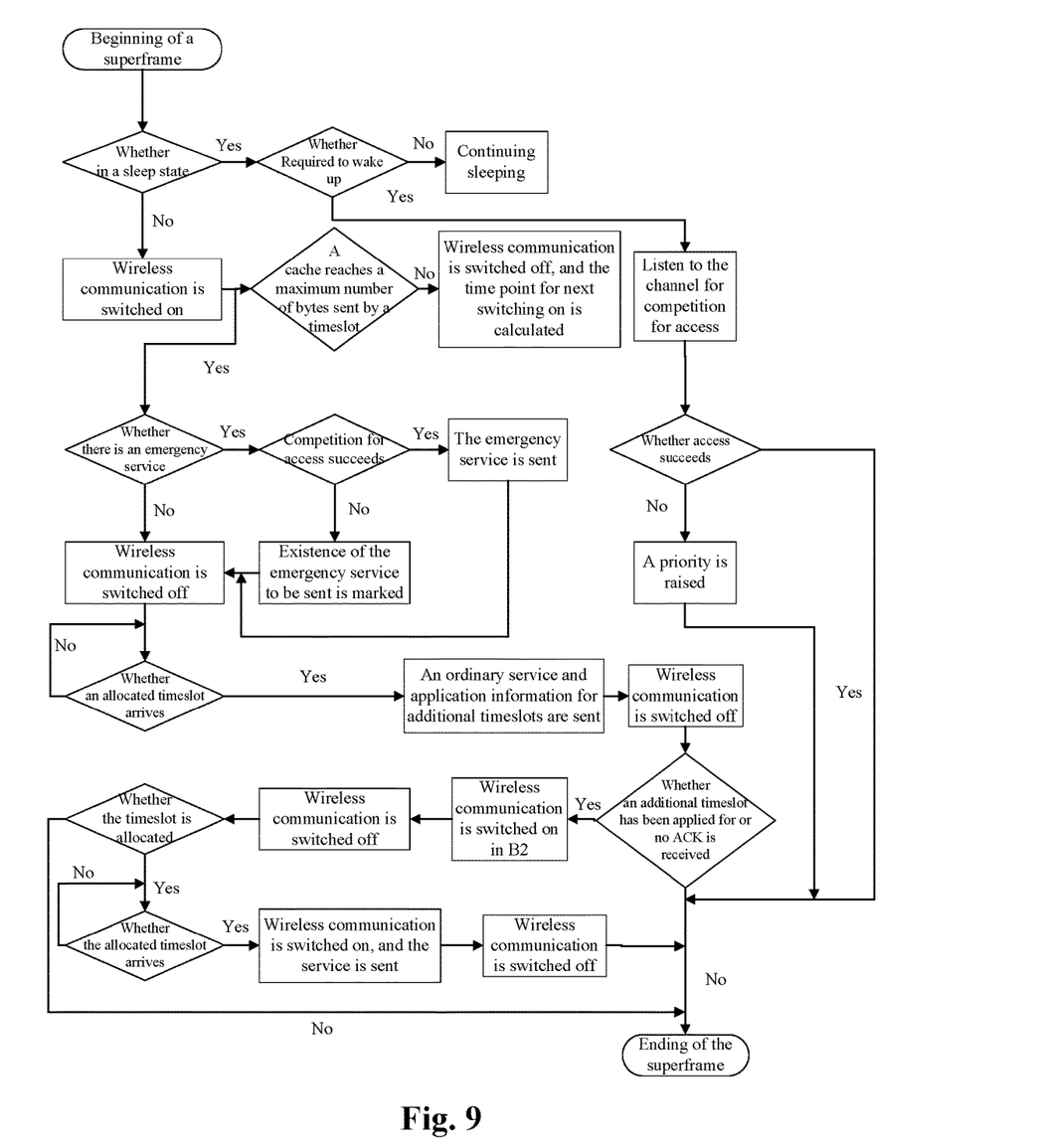
FIG. 9 is a working flowchart of a node in a superframe according to an exemplary embodiment of the present disclosure.

FIG. 8 is a working flowchart of a Hub in a superframe according to an exemplary embodiment of the present disclosure. FIG. 9 is a working flowchart of a node in a superframe according to an exemplary embodiment of the present disclosure. Steps implemented by the complementary sending method adopted in the exemplary embodiment may refer to FIG. 8 and FIG. 9.

The solution provided by the exemplary embodiment has the following advantages.

1: An unnecessary competition period of an original protocol is improved, a TDMA structure is adopted more, and from the abovementioned steps, it can be seen that the nodes switch on wireless communication only under a few conditions and are in a non-communication state more, so that unnecessary competitions are reduced, and power consumption is reduced.

2: The timeslots are reallocated by virtue of the second beacon frame in the superframe, so that the timeslots in the frame structure are utilized more completely, and existence of unnecessary timeslots where there is no information transmitted is reduced.

3: By the complementary sending method, communication robustness is enhanced.

Figure 10:
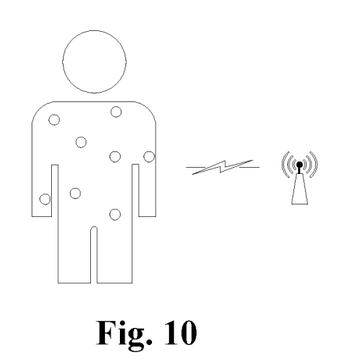
FIG. 10 is a schematic diagram of a system model according to an exemplary embodiment of the present disclosure.

The exemplary embodiment is used for communication between nodes located on a human body and a Hub. FIG. 10 is a schematic diagram of a system model according to an exemplary embodiment of the present disclosure. A network structure is shown in FIG. 10, nodes with different sampling rates are distributed on a body surface of a human body or in the body, a Hub is usually located in the vicinity of the human body, and for example, is arranged in a bedroom, and the Hub sends acquired human body information to some medical structures to implement long-term remote monitoring of a health condition of the human body through another network such as a WIFI network, a 3G network and a 4th-Generation (4G) network.

Communication between the nodes and the Hub includes the following steps.

Step 1: a beacon frame B1 is sent.

The Hub broadcasts timeslot allocation information and synchronous information to the nodes in a network through the beacon frame B1; and correspondingly, the nodes which access the network switch on wireless communication to receive the information in this period, then switch off wireless communication and calculate next time when wireless communication is switched on according to the received information.

Step 2: emergency services are transmitted.

Some nodes may generate sudden change sampling information, and such information is usually generated along with diseases of the human body, and is required to be timely sent. In a timeslot period EAP in a frame structure, the nodes send emergency services in a competition access manner. Competition priorities may be determined according to types of the nodes and sudden change degrees of the sampling information. A node which does not successfully access a channel marks itself to "have an emergency service to be sent", makes an application to the Hub for a timeslot in a timeslot period MAP1, and sends information in a timeslot period MAP2 after successful application.

Step 3: TDMA-based ordinary services are transmitted.

Each node in the network switches on wireless communication to communicate with the Hub if a timeslot allocated to it arrives, and in a communication process, not only sends the sampling information, but also is required to send additional service application information. Correspondingly, the Hub receives the information from each node, and records the additional service application information.

Step 4: a beacon frame 2 is sent.

Each node in the network switches on a receiver in B2 if it has applied for an additional timeslot, otherwise switches off wireless communication. In B2, the Hub is required to complete two tasks: 1, numbers of timeslots occupied respectively by MAP2 and CAP are planned according to the additional service application information; and 2: the timeslots of MAP2 are allocated to related nodes, and timeslot allocation information is issued through B2.

It is specified that the numbers of the timeslots occupied by MAP2 and CAP may be regulated, but a sum thereof has been fixed at the beginning of a frame, and may be regulated in different frames. Therefore, in B2, the Hub is required to calculate how to allocate certain numbers of timeslots to MAP2 and CAP. An algorithm is as follows.

First, it is supposed that, in a previous frame, the number of timeslots of MAP2 is m, the number of timeslots of CAP is n, and m+n=k.

1: If the number of the timeslots required in MAP2 in a current frame is more than m (a total number of additional timeslots for which the nodes apply is more than m), the number of the timeslots occupied by MAP2 is increased according to a requirement, and if the number of the timeslots is increased from m to m+a, the requirement may be met. If m+a≤k−2, the number of the timeslots occupied by MAP2 is regulated to be m+a; and if m+a>k−2, the number of the timeslots occupied by MAP2 is regulated to be k−2, and a total number of timeslots occupied by MAP2 and CAP is regulated to be m+a+2 through B1 in a next frame.

2: If the number of the timeslots required in MAP2 in the current frame is smaller than m, the number of the timeslots occupied by MAP2 is decreased, the number of the timeslots occupied by CAP is increased, and it is supposed that the number of the timeslots occupied by the CAP is increased from n to n+b. p is set to be an average number of sleep nodes in the network, and if n+b>2p, the total number of the timeslots occupied by MAP2 and CAP is regulated to be k−(n+b−2p) through B1 in the next frame.

After completing allocation of the timeslots of MAP2 and CAP, the Hub is required to allocate the timeslots of MAP2 to the corresponding nodes. An allocation method is as follows.

If the currently allocated number of the timeslots occupied by MAP2 may meet all the applications for additional timeslots, the timeslots are sequentially allocated to the corresponding nodes according to "emergency service", "service failed to be sent" and "other ordinary service". If the currently allocated number of the timeslots occupied by MAP may not meet all the applications for additional timeslots, timeslots are allocated to nodes corresponding to the type of "emergency service" and then the type of "service failed to be sent" and finally nodes corresponding to the type of "other ordinary service". For a node to which no timeslots are allocated, the Hub rises its priority, and allocates a timeslot to it in MAP2 of the next frame. The priority is for the same service type, that is, a priority of "emergency service" is higher than the type of "service failed to be sent", and a priority of "service failed to be sent" is higher than the type of "other ordinary service".

Step 5: TDMA-based complementary services are transmitted.

The Hub sequentially communicates with nodes which have additional services to be sent and are allocated with timeslots.

Step 6: new nodes or sleep nodes access the network.

Due to different sampling rates of nodes, some nodes with low sampling rates are not required to send information in each frame, and power consumption may be reduced in a manner of making them sleep. The sleep nodes are required to re-access the network when sending information. In addition, there may always be some new nodes required to access the network. The last timeslot period CAP n the superframe is configured for the nodes to access the network. If being required to sleep, a certain node may switch on wireless communication to sense the channel to compete for access in this period, and enter a sleep state in the next frame after obtaining permission. A node required to access the network switches on wireless communication to compete for access, sends access application information to the Hub after successful access, and sends information after obtaining a response.

In another embodiment, software is also provided, which is configured to execute the technical solutions described in the abovementioned embodiments and exemplary embodiments.

In another embodiment, a storage medium is also provided, in which the abovementioned software is stored, the storage medium including, but not limited to, an optical disk, a floppy disk, a hard disk, an erasable memory and the like.

Obviously, those skilled in the art should know that each module or each step of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the present disclosure is not limited to any specific hardware and software combination.

The above is only the exemplary embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the appended claims of the present disclosure.

INDUSTRIAL APPLICABILITY

As mentioned above, information interaction method, device and system for the WBAN provided by the embodiment of the present disclosure have the following beneficial effects: a problem existing in a signaling transmission structure of the WBAN in the related technology is solved. On the premise of ensuring that a packet successfully accesses a channel, a probability of a sending failure is reduced to a great extent, the timeslots are utilized to a greater extent, exemplary transmission of the emergency services is ensured as much as possible, and meanwhile, energy consumption of the nodes and the network is reduced.

What is claimed is:

1. An information interaction method for a Wireless Body Area Network (WBAN), comprising:
sending, by a Hub, beacon frames to nodes according to a preset superframe structure, and receiving, by the Hub according to the preset superframe structure, information sent by the nodes,
wherein the preset superframe structure comprises three phases, a first phase comprises a first beacon period, a first timeslot period and a second timeslot period, the first timeslot period being used by nodes to send an emergency service and the second timeslot period being used by nodes to send an ordinary service; a second phase comprises a second beacon period and a third timeslot period, the third timeslot period being used by nodes to complementarily send a service; and a third phase comprises a fourth timeslot period, the fourth timeslot period being used by nodes to send a sleep application and/or an access application.

2. The method as claimed in claim 1, wherein sending, by the Hub, the beacon frames to the nodes according to the preset superframe structure, and receiving, by the Hub according to the preset superframe structure, the information sent by the nodes comprises:

the Hub issuing, through a first beacon frame in the first beacon period, to nodes which access a network, a determined number of timeslots required in the first timeslot period used by the nodes to send the emergency service and timeslots allocated to a respective node in the second timeslot period used by the nodes to send the ordinary service.

3. The method as claimed in claim 1, wherein sending, by the Hub, the beacon frames to the nodes according to the preset superframe structure, and receiving, by the Hub according to the preset superframe structure, the information sent by the nodes comprises:

receiving, by the Hub in the first timeslot period, an emergency service sent by the nodes;

or, receiving, by the Hub in the second timeslot period, a Time Division Multiple Access (TDMA)-based ordinary service sent by the nodes, and/or, acquiring, by the Hub in the second timeslot period, application information for additional timeslots from the nodes.

4. The method as claimed in claim 3, wherein acquiring, by the Hub, the application information for additional timeslots from the nodes comprises at least one of:

receiving, by the Hub, application information, in which a service type is marked as an emergency service, from the nodes, wherein the application information comprises the number of required timeslots;

determining, by the Hub, service sending failures of the nodes, sending, by the Hub, Negative Acknowledgement (NACK) signals to the nodes, and deeming, by the Hub, that the nodes send application information in which a service type is marked as a service failed to be sent, wherein the number of required timeslots is the number of timeslots of the service failed to be sent; and receiving, by the Hub, application information, in which a service types is marked as other ordinary service, from the nodes, wherein the application information comprises the number of required timeslots.

5. The method as claimed in claim 4, after receiving, by the Hub, the TDMA-based ordinary service sent by the nodes, and/or, acquiring, by the Hub, the application information for additional timeslots from the nodes, further comprising:

sending, by the Hub, response information to the nodes, wherein the response information comprises one of:

an Acknowledgement (ACK) and an instruction OFF of not switching on wireless communication in the second beacon period, which are sent to the nodes under a condition that the Hub successfully receives the information sent by the nodes and the nodes do not apply for the additional timeslots;

an ACK and an instruction ON of switching on wireless communication in the second beacon period, which are sent to the nodes under a condition that the Hub successfully receives the information sent by the nodes and the nodes apply for the additional timeslots; and a NACK and an instruction ON of switching on wireless communication in the second beacon period, which are sent to the nodes under a condition that the Hub does not successfully receive the information sent by the nodes.

6. The method as claimed in claim 1, wherein sending, by the Hub, the beacon frames to the nodes according to the preset superframe structure, and receiving, by the Hub according to the preset superframe structure, the information sent by the nodes comprises:

the Hub issuing, through a second beacon frame in the second beacon period, to nodes which access the network, the determined number of timeslots required in the third timeslot period and the determined number of timeslots required in the fourth timeslot period, as well as timeslots allocated in the third timeslot period to each node which applies for the additional timeslots.

7. The method as claimed in claim 6, wherein determining, by the Hub, the number of the timeslots required in the third timeslot period and the number of the timeslots required in the fourth timeslot period comprises:

when a total number of the additional timeslots for which the nodes apply in a current frame is more than m, and is m+a, if m+a≤k−2, regulating the number of the timeslots in the third timeslot period to be m+a, and if m+a>k−2, regulating the number of the timeslots in the third timeslot period to be k−2, and regulating a total number of timeslots in the third timeslot period and the fourth timeslot period to be m+a+2 through a first beacon period in a next frame; and/or, when the total number of the additional timeslots for which the nodes apply in the current frame is smaller than m, increasing the number of the timeslots in the fourth timeslot period from n to n+b, wherein p is set to be an average number of sleep nodes in the network, and if n+b>2p, regulating the total number of the timeslots in the third timeslot period and the fourth timeslot period to be k−(n+b−2p) through the first beacon period in the next frame, wherein m is the number of timeslots in a third timeslot period in a previous frame, n is the number of timeslots in a fourth timeslot period in the previous frame, and k=m+n.

8. The method as claimed in claim 6, wherein allocating, by the Hub, in the third timeslot period the timeslots to each node which applies for the additional timeslots comprises:

allocating, by the Hub, timeslots to nodes which apply for additional timeslots for sending an emergency service;

after allocation of the additional timeslots for sending the emergency service is completed, allocating, by the Hub, timeslots to nodes which apply for resending of a service failed to be sent; and after allocation of the additional timeslots for resending the service failed to be sent is completed, allocating, by the Hub, timeslots to nodes which apply for continuing of sending of an ordinary service, wherein for a node to which no timeslots are allocated, the Hub preferably allocates a timeslot to this node among nodes of the same type in the third timeslot period in the next frame.

9. The method as claimed in claim 1, wherein sending, by the Hub, the beacon frames to the nodes according to the preset superframe structure, and receiving, by the Hub according to the preset superframe structure, the information sent by the nodes comprises:

receiving, by the Hub in the third timeslot period, a service complementarily sent by the nodes;
or,
receiving, by the Hub in the fourth timeslot period, a sleep application and/or an access application sent by the nodes.

10. The method as claimed in claim 9, after receiving, by the Hub, the sleep application and/or the access application sent by the nodes, further comprising:
not allocating, by the Hub in a second timeslot period in the next frame, timeslots to nodes which send the sleep application; and/or,
allocating, by the Hub in the second timeslot period in the next frame, timeslots to nodes which send the access application.

11. An information interaction method for a Wireless Body Area Network (WBAN), comprising:
sending, by a node, information to a Hub according to a preset superframe structure, and receiving, by the node according to the preset superframe structure, a beacon frame sent by the Hub,
wherein the preset superframe structure comprises three phases, a first phase comprises a first beacon period, a first timeslot period and a second timeslot period, the first timeslot period being used by nodes to send an emergency service and the second timeslot period being used by nodes to send an ordinary service; a second phase comprises a second beacon period and a third timeslot period, the third timeslot period being used by nodes to complementarily send a service; and a third phase comprises a fourth timeslot period, the fourth timeslot period being used by nodes to send a sleep application and/or an access application.

12. The method as claimed in claim 11, wherein sending, by the node, the information to the Hub according to the preset superframe structure, and receiving, by the node according to the preset superframe structure, the beacon frame sent by the Hub comprises:
receiving, by the node in the first beacon period, a first beacon frame sent by the Hub to acquire the number of timeslots required in the first timeslot period used by nodes to send the emergency service and timeslots allocated to the current node in the second timeslot period used by nodes to send the ordinary service.

13. The method as claimed in claim 11, wherein sending, by the node, the information to the Hub according to the preset superframe structure, and receiving, by the node according to the preset superframe structure, the beacon frame sent by the Hub comprises:
judging, by the node in the first timeslot period, whether the node has an emergency service to be sent or not;
if the node has an emergency service to be sent, competing, by the node, to access a channel, and sending, by the node, the emergency service to the Hub; and
if the node fails in the competition, marking, by the node, that the node has an emergency service to be sent.

14. The method as claimed in claim 11, wherein sending, by the node, the information to the Hub according to the preset superframe structure, and receiving, by the node according to the preset superframe structure, the beacon frame sent by the Hub comprises:
sending, by the node, an ordinary service in the second timeslot period according to timeslots issued by the Hub in the first beacon period and used by the current node to send a Time Division Multiple Access (TDMA)-based ordinary service, and/or, sending, by the node, application information for additional timeslots in the second timeslot period.

15. The method as claimed in claim 14, wherein sending, by the node, the application information for the additional timeslots comprises at least one of:
sending, by the node, application information in which a service type is marked as an emergency service, wherein the application information comprises the number of required timeslots; and
sending, by the node, application information in which a service type is marked as other ordinary service, wherein the application information comprises the number of required timeslots.

16. The method as claimed in claim 11, wherein sending, by the node, the information to the Hub according to the preset superframe structure, and receiving, by the node according to the preset superframe structure, the beacon frame sent by the Hub comprises:
receiving, by the node in the second beacon period, a second beacon frame issued by the Hub to acquire the number of timeslots required in the third timeslot period and the number of timeslots required in the fourth timeslot period as well as timeslots allocated, in the third timeslot period, to the node which applies for additional timeslots.

17. The method as claimed in claim 11, wherein sending, by the node, the information to the Hub according to the preset superframe structure, and receiving, by the node according to the preset superframe structure, the beacon frame sent by the Hub comprises:
complementarily sending, by the node, a service in the third timeslot period according to the timeslots issued by the Hub in the second beacon period and allocated to the node which applies for the additional timeslots;
or,
competing, by the node, to access the channel in the fourth timeslot period and sending, by the node, a sleep application and/or an access application to the Hub in the fourth timeslot period.

18. The method as claimed in claim 17, after competing, by the node, to access the channel and sending, by the node, the sleep application and/or the access application to the Hub, further comprising:
if the node sends the sleep application to the Hub, entering, by the node, a sleep state in a next frame; and/or,
if the node sends the access application to the Hub, receiving, by the node in a first beacon period of the next frame, timeslots allocated to the node by the Hub.

19. An information interaction device for a Wireless Body Area Network (WBAN), located in a Hub, comprising a hardware processor arranged to execute the following program modules:
a first sending module, arranged to send beacon frames to nodes according to a preset superframe structure; and
a first receiving module, arranged to receive, according to the preset superframe structure, information sent by the nodes,
wherein the preset superframe structure comprises three phases, a first phase comprises a first beacon period, a first timeslot period and a second timeslot period, the first timeslot period being used by nodes to send an emergency service and the second timeslot period being used by nodes to send an ordinary service; a second phase comprises a second beacon period and a third timeslot period, the third timeslot period being used by nodes to complementarily send a service; and a third phase comprises a fourth timeslot period, the fourth timeslot period being used by nodes to send a sleep application and/or an access application.

20. An information interaction device for a Wireless Body Area Network (WBAN), located in a node, comprising a hardware processor arranged to execute the following program modules:
a second sending module, arranged to send information to a Hub according to a preset superframe structure; and
a second receiving module, arranged to receive, according to the preset superframe structure, a beacon frame sent by the Hub,
wherein the preset superframe structure comprises three phases, a first phase comprises a first beacon period, a first timeslot period and a second timeslot period, the first timeslot period being used by nodes to send an emergency service and the second timeslot period being used by nodes to send an ordinary service; a second phase comprises a second beacon period and a third timeslot period, the third timeslot period being used by nodes to complementarily send a service; and a third phase comprises a fourth timeslot period, the fourth timeslot period being used by nodes to send a sleep application and/or an access application.

21. An information interaction system for a Wireless Body Area Network (WBAN), comprising the information interaction device, located in a Hub, for the WBAN as claimed in claim 19 and further comprising an information interaction device, located in a node, for the WBAN, wherein the information interaction device, located in the Sensor, for the WBAN comprises a hardware processor arranged to execute the following program modules:
a second sending module, arranged to send information to a Hub according to a preset superframe structure; and
a second receiving module, arranged to receive, according to the preset superframe structure, a beacon frame sent by the Hub,
wherein the preset superframe structure comprises three phases, the first phase comprises a first beacon period, a first timeslot period and a second timeslot period, the first timeslot period being used by Sensors to send an emergency service and the second timeslot period being used by Sensors to send an ordinary service; the second phase comprises a second beacon period and a third timeslot period, the third timeslot period being used by Sensors to complementarily send a service; and the third phase comprises a fourth timeslot period, the fourth timeslot period being used by Sensors to send a sleep application and/or an access application.

\* \* \* \* \*